US007911981B2

(12) United States Patent
Park et al.

(10) Patent No.: US 7,911,981 B2
(45) Date of Patent: Mar. 22, 2011

(54) METHOD FOR CONFIGURING 1:N OVERLAY MULTICAST NETWORK OF MULTICAST AGENT IN WIRELESS LAN ENVIRONMENT AND MULTICAST AGENT THEREFOR

(75) Inventors: Juyoung Park, Daejeon (KR); Shin Gak Kang, Daejeon (KR); Ok-Jo Jeong, Daejeon (KR); Eiyeon Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 12/086,053

(22) PCT Filed: Dec. 8, 2006

(86) PCT No.: PCT/KR2006/005311
§ 371 (c)(1),
(2), (4) Date: Jun. 5, 2008

(87) PCT Pub. No.: WO2007/066999
PCT Pub. Date: Jun. 14, 2007

(65) Prior Publication Data
US 2009/0080344 A1 Mar. 26, 2009

(30) Foreign Application Priority Data

Dec. 8, 2005 (KR) .................. 10-2005-0120009
Oct. 20, 2006 (KR) .................. 10-2006-0102455

(51) Int. Cl.
*H04L 12/28* (2006.01)
(52) U.S. Cl. .............. 370/256; 370/254; 370/255
(58) Field of Classification Search .............. 370/254, 370/255, 256, 351, 408; 709/223, 224, 225, 709/226
See application file for complete search history.

(56) References Cited

U.S. PATENT DOCUMENTS
5,331,637 A 7/1994 Francis et al.
(Continued)

FOREIGN PATENT DOCUMENTS
KR 10-20010083840 9/2001
(Continued)

OTHER PUBLICATIONS
International Search Report mailed Mar. 16, 2007 in connection with International Application No. PCT/KR2006/005311.
(Continued)

*Primary Examiner* — Chi H Pham
*Assistant Examiner* — Robert Lopata
(74) *Attorney, Agent, or Firm* — Staas & Halsey LLP

(57) ABSTRACT

A method of configuring a multicast agent and a 1:N overlay multicast network considering a wireless local area network (WLAN) environment of the same are provided. The method includes: a session manger generating a first database with entries of multicast agents subscribing to a session and multicast agents that have applied for subscription to a session but have not been confirmed for normal operation; a multicast agent generating a second database with entries of a path from the root of a tree to which the multicast agent belongs, a hierarchical relation in the tree, the list of probed neighboring nodes, and a list of not-probed neighboring nodes; the multicast agent subscribing to the overlay network; obtaining information on neighboring multicast agents; setting a multicast agent which is determined to be optimal based on the obtained information, as a parent node; and if a multicast agent providing a tree improved from the current tree is found, changing the parent node. According to the method, multicast communication can be easily introduced into a wireless environment without particular modification of existing Internet router equipment.

16 Claims, 18 Drawing Sheets

U.S. PATENT DOCUMENTS

| | | | |
|---|---|---|---|
| 6,252,856 B1 * | 6/2001 | Zhang | 370/254 |
| 6,507,562 B1 * | 1/2003 | Kadansky et al. | 370/216 |
| 6,684,331 B1 | 1/2004 | Srivastava | |
| 6,791,981 B1 * | 9/2004 | Novaes | 370/390 |
| 6,798,739 B1 * | 9/2004 | Lee | 370/216 |
| 7,035,937 B2 | 4/2006 | Haas et al. | |
| 7,333,486 B2 | 2/2008 | Novaes | |
| 7,386,606 B2 | 6/2008 | Massoulie et al. | |
| 7,457,288 B2 * | 11/2008 | Park et al. | 370/390 |
| 7,505,450 B2 * | 3/2009 | Castagnoli | 370/350 |
| 7,596,595 B2 | 9/2009 | Budge et al. | |
| 7,606,178 B2 * | 10/2009 | Rahman et al. | 370/256 |
| 7,630,370 B2 | 12/2009 | Deshpande et al. | |
| 2003/0095523 A1 | 5/2003 | Korus et al. | |
| 2005/0007964 A1 * | 1/2005 | Falco et al. | 370/256 |
| 2005/0120088 A1 | 6/2005 | Liu et al. | |
| 2006/0026656 A1 | 2/2006 | Chen | |
| 2006/0215582 A1 * | 9/2006 | Castagnoli et al. | 370/254 |
| 2006/0268749 A1 * | 11/2006 | Rahman et al. | 370/256 |
| 2007/0028002 A1 | 2/2007 | McCanne | |
| 2008/0222277 A1 * | 9/2008 | Park et al. | 709/223 |
| 2009/0271504 A1 * | 10/2009 | Ginter et al. | 709/220 |

FOREIGN PATENT DOCUMENTS

| | | |
|---|---|---|
| KR | 2001-0083840 | 9/2001 |
| KR | 10-2001-0105387 | 11/2001 |
| KR | 2001-0105387 | 11/2001 |
| KR | 2002-0054228 | 7/2002 |
| KR | 10-2004-0040136 | 5/2004 |
| KR | 10-2006-0067081 | 6/2006 |
| KR | 10-2006-0084749 | 7/2006 |
| WO | 03/036911 A2 | 5/2003 |

OTHER PUBLICATIONS

Park J., "RMCP-2 Tree Management Mechanism." ISO/IEC JTC 1/SC 6, Telecommunication and Information Exchange Between Systems, Nov. 8, 2004.

U.S. Appl. No. 11/577,381, filed Apr. 22, 2007, Ju Young Park, et al.

* cited by examiner

2ND DATABASE (MA DB)

NLDB

METHOD FOR CONFIGURING 1:N OVERLAY MULTICAST NETWORK OF MULTICAST AGENT IN WIRELESS LAN ENVIRONMENT AND MULTICAST AGENT THEREFOR

CROSS-REFERENCE TO RELATED PATENT APPLICATIONS

This application claims the benefit of Korean Patent Application No. 10-2005-0120009, filed on Dec. 8, 2005, and Korean Patent Application No. 10-2006-0102455, filed on Oct. 20, 2006, in the Korean Intellectual Property Office, the disclosures of which are incorporated herein in their entirety by reference.

BACKGROUND OF THE INVENTION

1. Field of the Invention

The present invention relates to a method of effectively configuring an overlay 1:N data transmission tree capable of transmitting effective group data to mobile hosts (MHs) in a wireless local area network (WLAN) environment, and more particularly, to a method of configuring a data transmission tree enabling effective multicast communication even in a WLAN environment without changing existing Internet infrastructures, using a one-to-one communication method (unicast method) in a current wired and/or wireless environment, and a multicast agent therefor.

2. Description of the Related Art

Multicast technology allows a transmitter to efficiently use the resources and bandwidth of a transmission node when the transmitter transmits the same data to a plurality of receivers at the same time, and is the most suitable mechanism for transferring application data for group communication methods.

However, up to now multicast technology (or internet protocol (IP) multicast) has been only partially enabled, and only for testbeds, some intranets, school networks, or experimental networks. The reasons why the multicast is not fully supported include the cost required for replacing all routers currently in the Internet with multicast-enabled routers, and technical problems, including address allocation, multicast routing protocols, and hardware state management mechanisms. These problems are serious in a wired network environment but more so in a wireless network environment. This is because when a mobile host (MH) communicating in a wireless local area network (WLAN) environment changes the WLAN, a data transmission path from a transmitter to the MH passing through wired and/or wireless environments must be modified.

First, the problem of IP multicast in an ordinary wired network environment will be explained.

An example of a load problem of an IP multicast router is that a current IP multicast backbone router must be heavily loaded in order to manage a routing table for members frequently subscribing to and/or withdrawing from a group. However, actually, an IP multicast network is a dynamic network which frequently changes as applications start and end, unlike a unicast fixed IP network. That is, to generate an IP multicast data transmission path, an application subscribes to a session which is publicly noticed in advance (group address, port number, digital content, etc.), and according to the subscription a data transmission and reception path is generated.

Next, the problem of IP multicast in an ordinary wireless network will be explained.

MHs in a wireless network can freely subscribe to or withdraw from a group as terminal nodes in a wired network. In addition, even a node subscribing to a group communication causes a handover by traveling through WLAN segments.

Accordingly, there is a recent demand for enabling multicast by using programs at an application layer without replacing Internet equipment.

According to this method, a non-multicast area for which a multicast router is not directly connected to a multicast backbone is connected using tunneling through a virtual multicast router, thereby enabling IP multicast between a transmitter and receivers. When this method is employed, ordinary personal computer (PC) users can access a virtual multicast router and use IP multicast. However, the address collision problem of IP multicast or the load problem to manage multicast routing state information in each multicast device cannot be essentially solved. Furthermore, since the tunneling technique for connecting the non-multicast area considers only tunneling with a short-distance hop, a bottleneck can occur in an intermediate node connecting the tunneling.

SUMMARY OF THE INVENTION

The present invention provides a method of configuring a 1:N overlay multicast network considering a wireless local area network (WLAN) environment through terminal hosts or servers in order to smoothly support group communication even without changing network equipment or installing additional hardware, in a current unicast-based Internet environment that cannot fully support Internet protocol (IP) multicast, and a multicast agent therefor.

According to an aspect of the present invention, there is provided a method of configuring a 1:N overlay multicast network considering a wireless local area network (WLAN) environment of a multicast agent, the method including: a session manger generating a first database with entries of multicast agents subscribing to a session and multicast agents that have applied for subscription to a session but have not been confirmed for normal operation; a multicast agent generating a second database with entries of a path from the root of a tree to which the multicast agent. belongs, a hierarchical relation in the tree, the list of probed neighboring nodes, and a list of not-probed neighboring nodes; the multicast agent subscribing to the overlay network; obtaining information on neighboring multicast agents; setting a multicast agent which is determined to be optimal based on the obtained information, as a parent node; and if a multicast agent providing a tree improved from the current tree is found, changing the parent node.

According to another aspect of the present invention, there is provided a method of configuring a 1:N overlay multicast network considering a WLAN environment of a multicast agent, the WLAN environment formed of one or more multicast agents, the method including: if a loop is detected based on a heart beat received from a root node, changing a parent node; and if an occurrence of network partitioning is detected based on whether or not the heart beat is periodically received, changing the parent node.

According to another aspect of the present invention, there is provided a method of configuring a 1:N overlay multicast network considering a WLAN environment of a multicast agent of one or more multicast agents forming the 1:N multicast network in the WLAN environment, the method including: receiving a subscription request from a mobile node moving into a region controlled by a current multicast agent; if authentication of the mobile node is successful, obtaining information on a multicast agent to which the mobile node was connected, from the mobile node; according to the information, determining to select as the parent node of the current node, a new multicast agent or the multicast agent to which the mobile node was connected; and performing parent node switching for optimizing a tree.

According to another aspect of the present invention, there is provided a multicast agent forming a 1:N overlay multicast network considering a WLAN environment, the multicast agent including: a first database generated by a session manager with entries of multicast agents subscribing to a session and multicast agents that have applied for subscription to a session but have not been confirmed for normal operation; a second database base generated by the multicast agent with entries of a path from the root of a tree to which the multicast agent belongs, a hierarchical relation in the tree, the list of probed neighboring nodes, and a list of not-probed neighboring nodes; a bootstrapping unit obtaining information on the multicast agents subscribing to the session and operating in the first database if a subscription to the session is requested from the session manager and the request is approved; a MAP discovery unit updating the second database by measuring the transmission qualities of the multicast agents, examining the not-probed neighboring nodes, and then updating the list of the probed neighboring nodes with authenticated nodes; a parent node unit selecting a multicast agent optimal for configuring a network based on the information, as a parent node, and switching parent nodes based on periodically updated information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. First, elements of the present invention and the environment in which the present invention will be used will be explained with reference to FIGS. 1 and 2.

Figure 1:
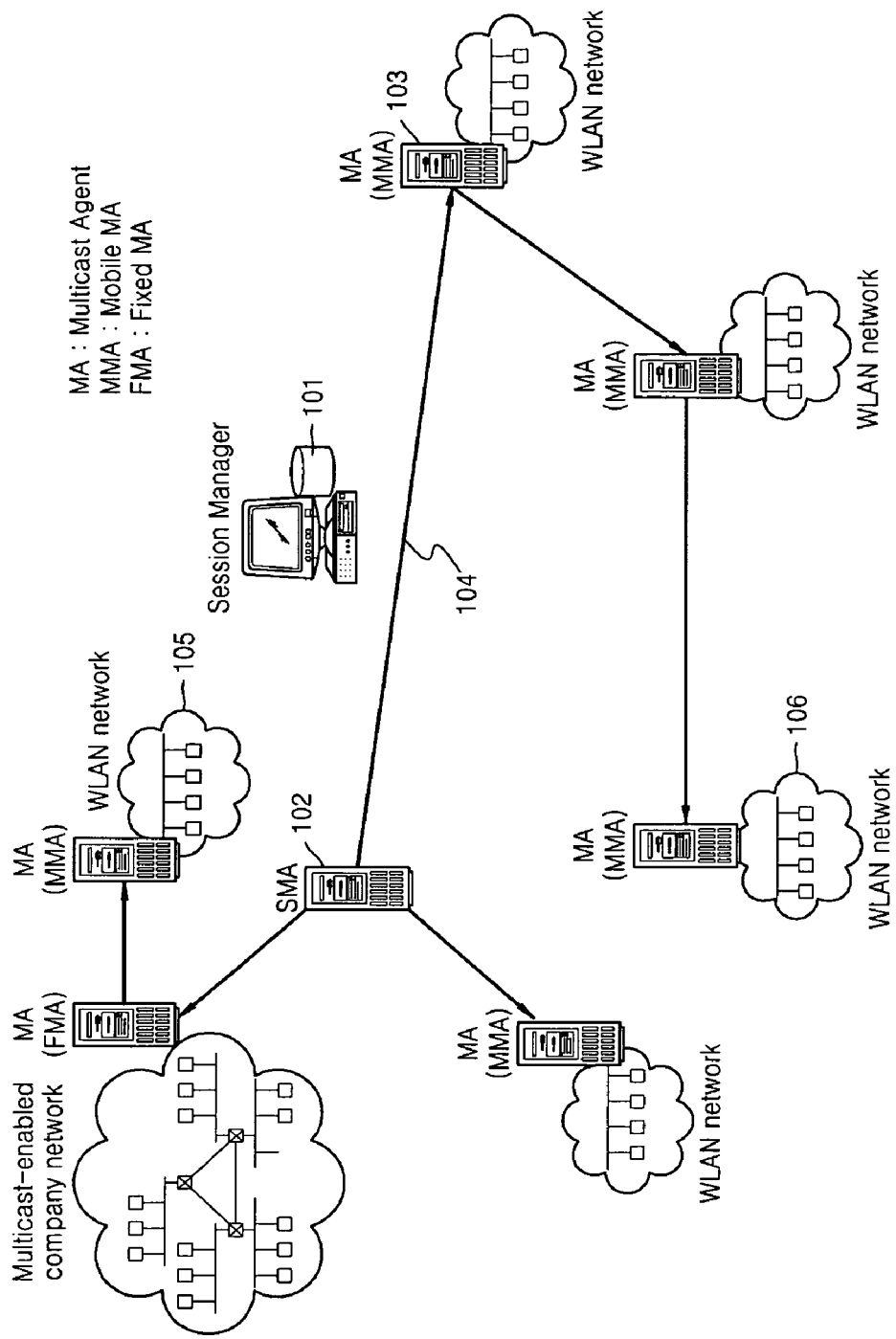
FIG. 1 is a diagram illustrating the structure of a network to which an embodiment of the present invention is applied.
Figure 2:
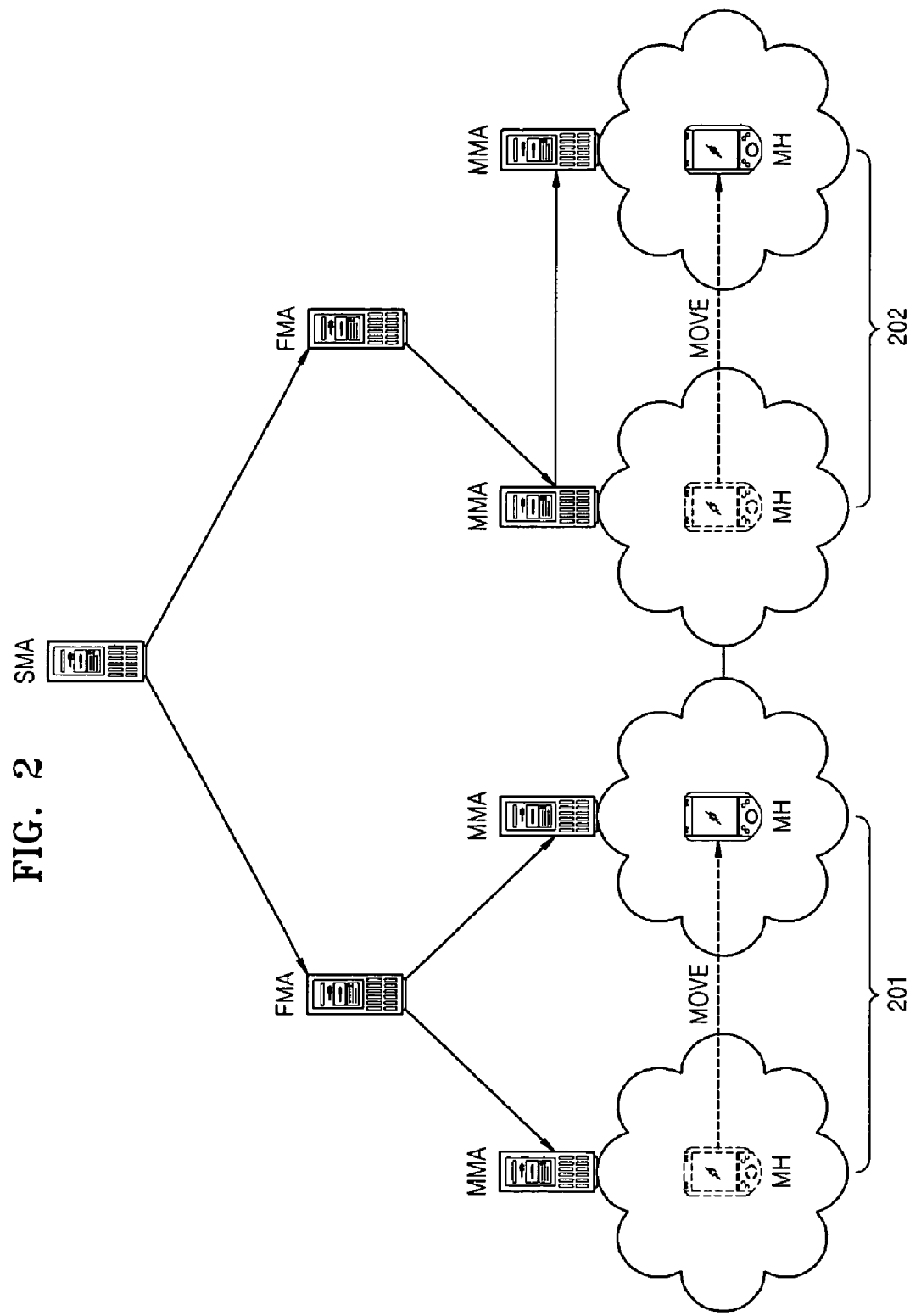
FIG. 2 is a diagram illustrating a situation where a mobile host moves in a wireless local area network (WLAN) according to an embodiment of the present invention.

FIG. 1 is a diagram illustrating the structure of a network to which an embodiment of the present invention is applied, and FIG. 2 is a diagram illustrating a situation where a mobile host (MH) moves in a wireless local area network (WLAN) according to an embodiment of the present invention. Major elements of the present invention are a session manager (SM, or an SM application) 101 which can be implemented as a transmission host or a separate system, a sender-side multicast agent (SMA, or an SMA application) 102 transmitting data from a transmission node, and a multicast agent (MA) 103 transmitting multicast data reliably or in real-time from a receiver end or a termination network end. The MA 103 is broadly broken down into a mobile multicast agent and a fixed multicast agent.

A channel connecting an SMA and an MA in a unicast environment is formed of a reliable or real-time unicast hop-by-hop channel 104 with respect to the characteristics of the data transmitted. In the case of real-time multicast transmission, a local subnetwork 105, such as a local area network (LAN), or a pure IP multicast network 106 established locally can be supported.

FIG. 2 illustrates a handover 201 in the case of identical parent nodes and a handover 202 in the case of different parent nodes.

The present invention allows MHs to move across networks. When an MH moves through different networks, the present invention provides both methods for the handover 201 switching the current parent node of the MH, and the handover 202 without switching the current parent node of the MH.

Figure 3:
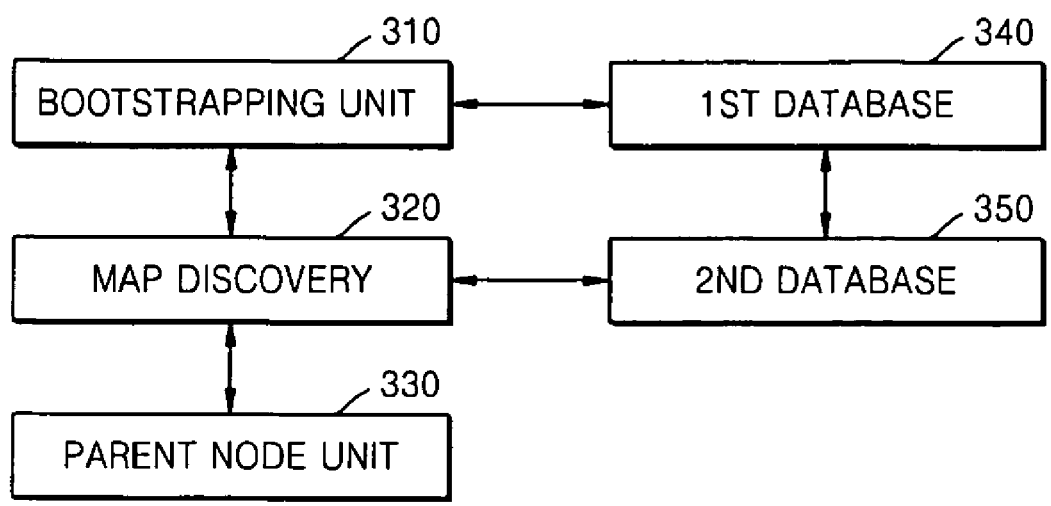
FIG. 3 is a block diagram illustrating the structure of a network configuring apparatus according to an embodiment of the present invention.
Figure 4:
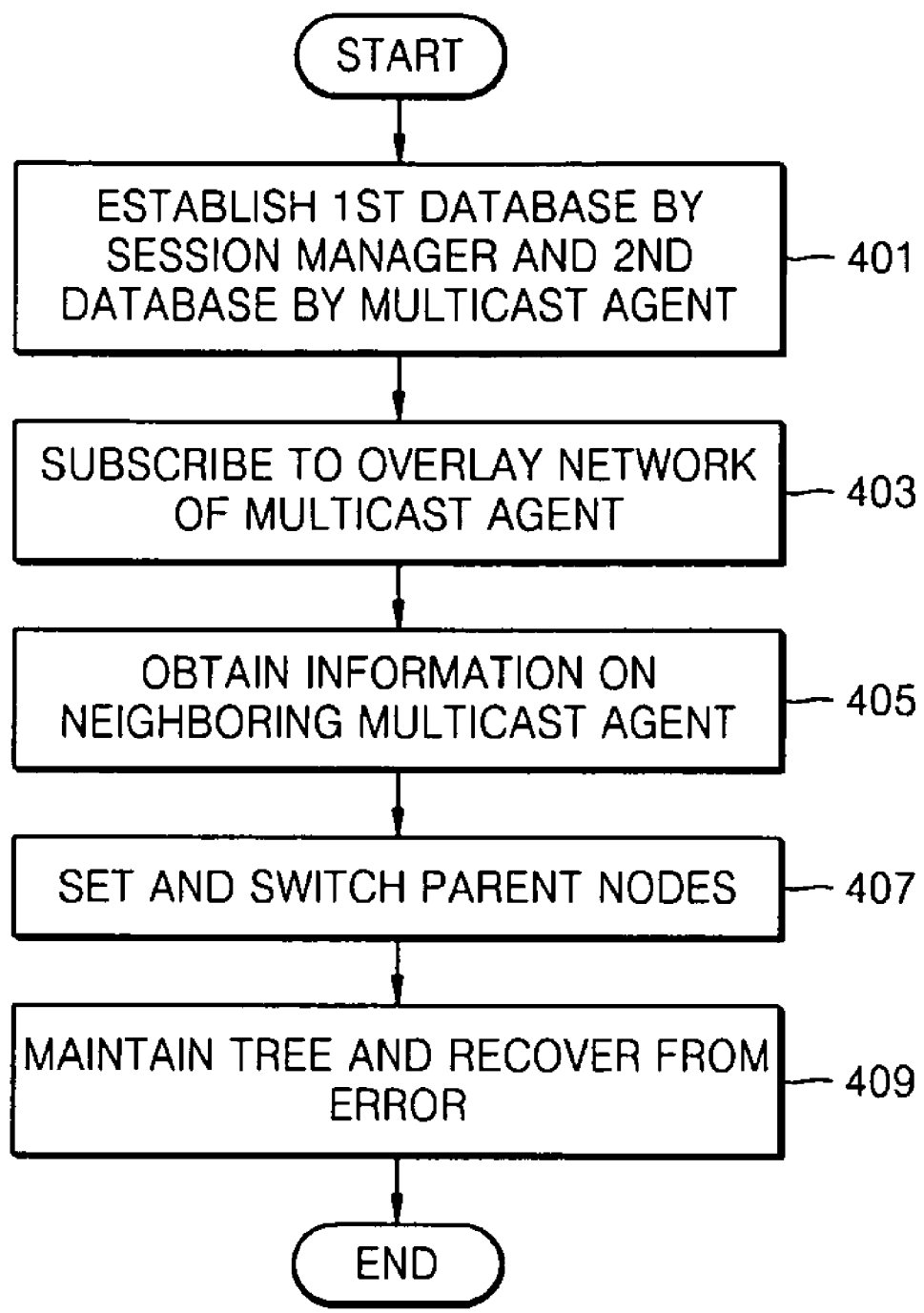
FIG. 4 is a flowchart illustrating a method of configuring a network according to an embodiment of the present invention.

FIG. 3 is a block diagram illustrating the structure of a network configuring apparatus according to an embodiment of the present invention, and FIG. 4 is a flowchart illustrating a method of configuring a network according to an embodiment of the present invention. First, a first database 340 is established by an SM to have the structure illustrated in FIG. 7A, with entries of multicast agents subscribing to a session, and multicast agents that have applied for subscription to a session but have not been confirmed for normal operation. A second database 350 is established by an MA to have the structure illustrated in FIG. 7B, with entries of a path from a root of a tree to which the MA belongs, hierarchical relations in the tree, a list of probed neighbor nodes, and a list of not-probed neighbor nodes, in operation 401.

A bootstrapping unit 310 requests subscription to a session to the SM, and if the request is approved, obtains from the first database 340 information of MAs subscribing to the session and operating, in operation 403.

A MAP discovery unit 320 measures transmission qualities of neighboring multicast agents, updates the second database 350, performs examination of the not-probed neighboring nodes, and updates the list of probed neighboring nodes with authenticated nodes in operation 405.

A parent node unit 330 selects a multicast agent optimal to generate a network, as a parent node based on the information, and then switches the parent. node based on the information which is periodically updated in operation 407.

A tree management unit (not shown) performs determination based on a heart beat transmitted by a root. If a loop occurs, the tree management unit cuts the loop of the root, and performs loop recovery for setting a new parent node. If network partitioning occurs, the tree management unit determines whether or not a session is finished. If the session is finished the MA leaves the session, and if the session is not finished network partitioning recovery is performed to set a parent node. If a newly entering mobile node is authenticated, a handover supporting unit (not shown) compares information of a previous MA which the mobile node accessed with information on the parent node in the tree, determines the node which has better characteristics to be a parent node, and provides a wireless data service to the mobile node.

Figure 5:
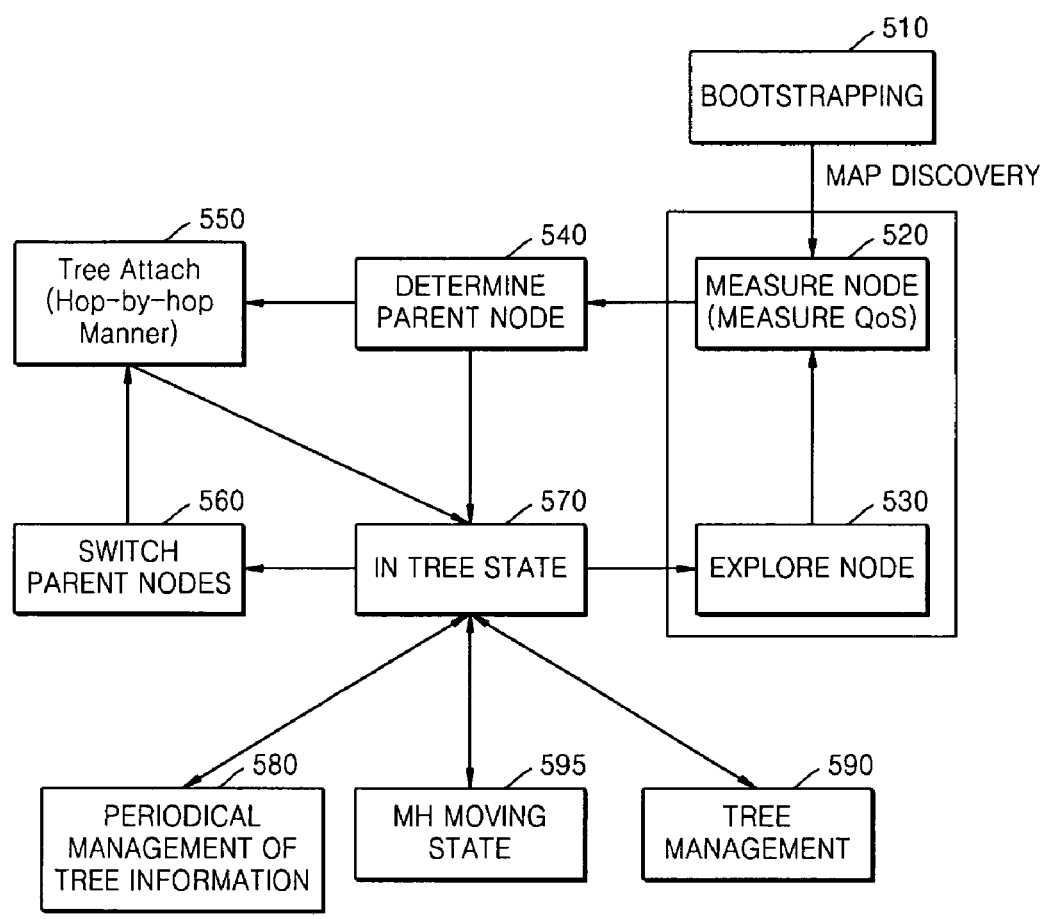
FIG. 5 is a more detailed schematic diagram illustrating the method of FIG. 4 according to an embodiment of the present invention.

FIG. 5 is a more detailed schematic diagram illustrating the method of FIG. 4 according to an embodiment of the present invention, and shows each function. First, a bootstrapping operation 510 is performed, beginning with an application user for subscription to an overlay network, and then a MAP discovery operation is performed. The MAP discovery operation includes a node measurement operation 520 for diagnosing transmission quality, such as transmission delay and bandwidths of neighboring nodes, and a node exploring operation 530 for searching neighboring nodes. After the MAP discovery operation is performed, a parent decision operation 540 is performed, in which a node that the current node determines to be optimum is set as the parent node of the current node. Then, a tree attach operation 550 in which the parent node is requested to transfer data is performed. At this point the node is in an IN_TREE state in which communication is possible in operation 570. Nodes in the IN_TREE state continuously repeat the MAP discovery operation and the parent decision operation, thereby continuously monitoring the overlay network. If a node capable of improving the current state is found, a parent switching operation, in which the current parent node is replaced by a new parent node, can be performed in operation 560. Also, periodical tree information management 580 is performed, and if an error occurs in a data transmission tree, the tree management operation 590 is performed. An MH moving state management operation 595 enables fast data transmission to a new network when the MH moves between WLAN networks.

Figure 6A:
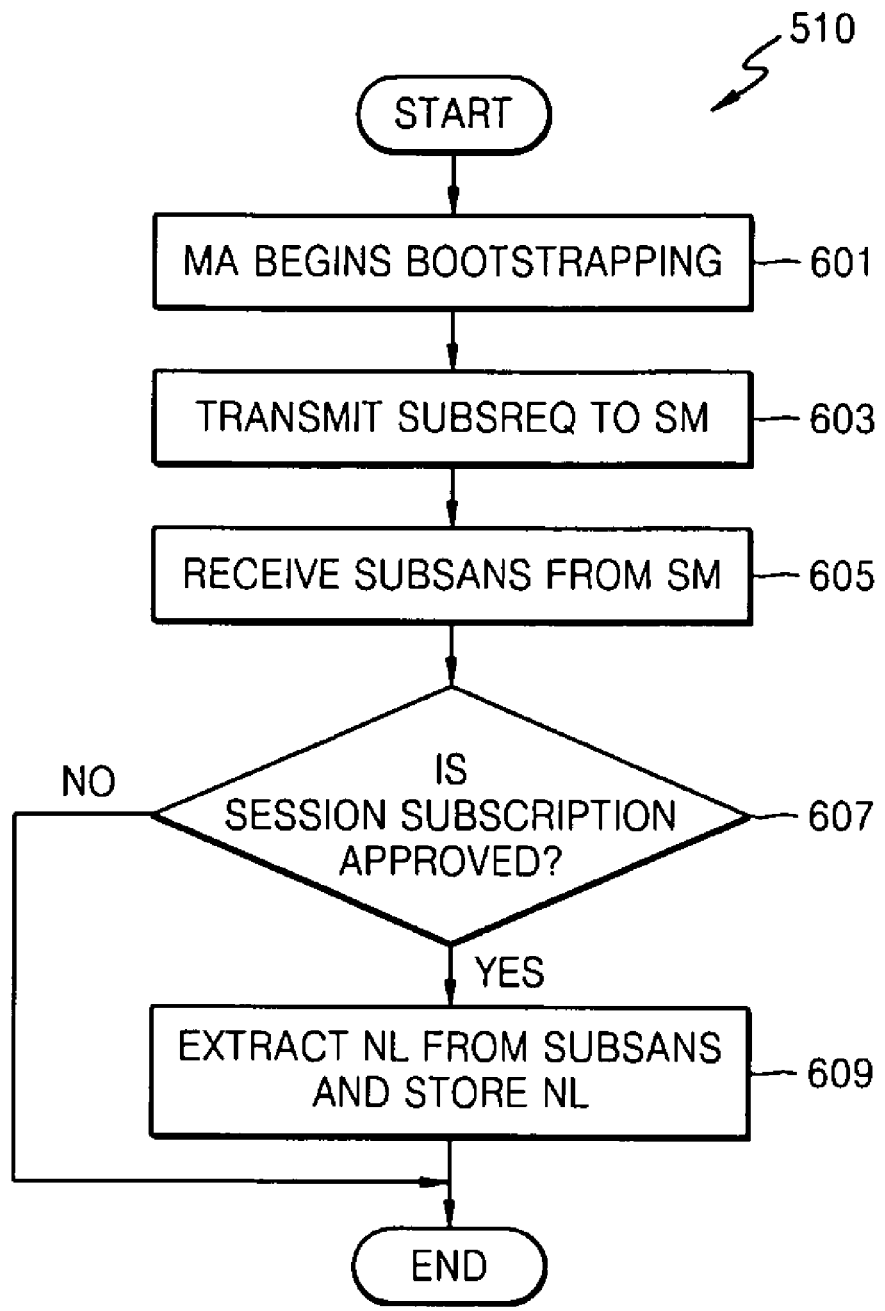
FIG. 6A is a flowchart illustrating a bootstrapping process of a multicast agent according to an embodiment of the present invention.
Figure 6B:
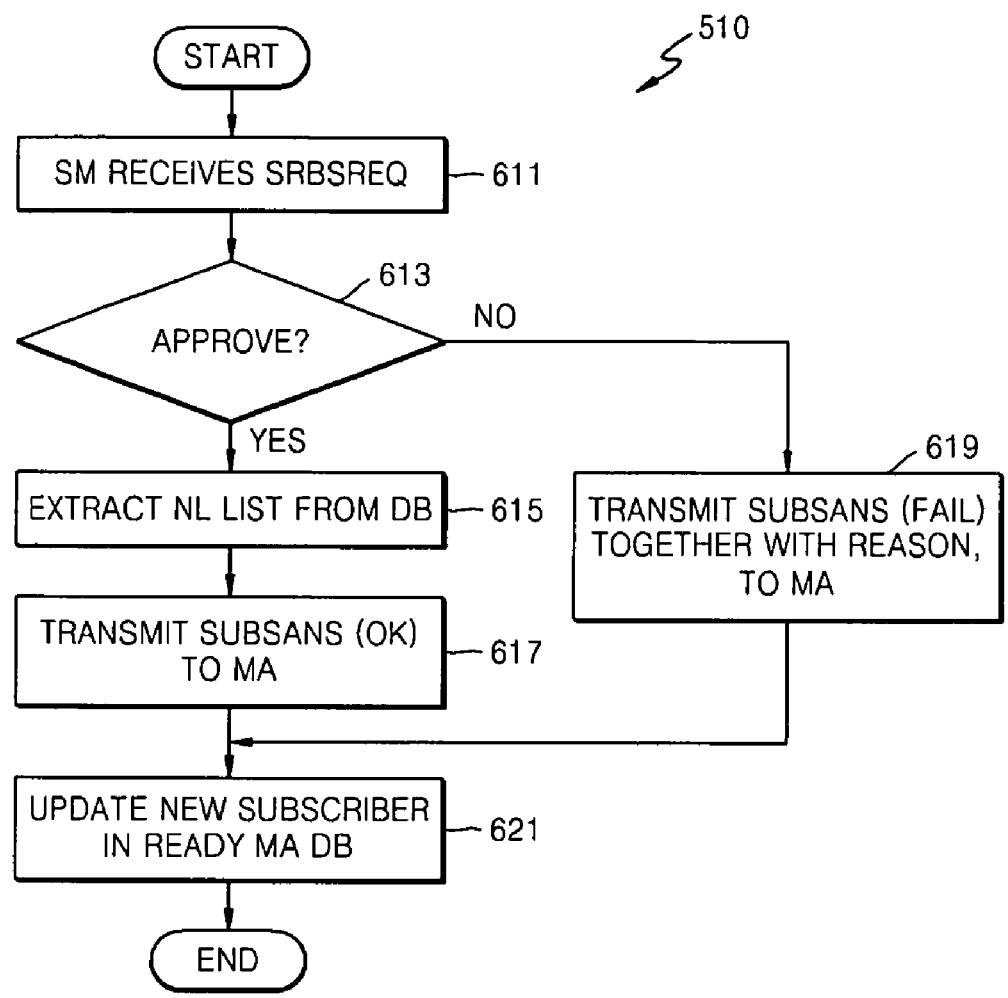
FIG. 6B is a flowchart illustrating a bootstrapping process of a session manager according to an embodiment of the present invention.
Figure 7A:
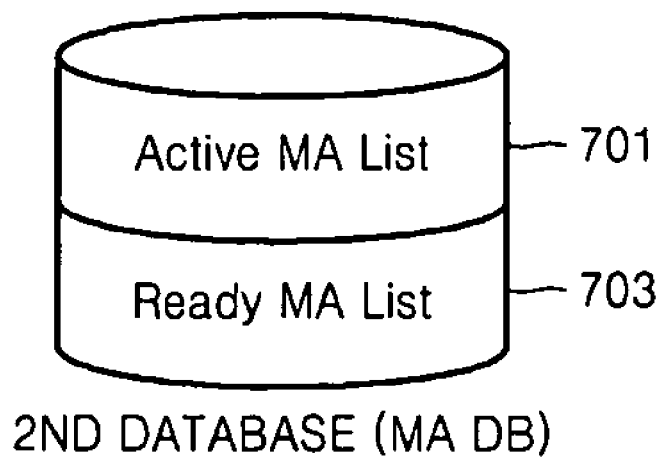
FIG. 7A is a diagram illustrating the structure of a database for managing memberships by a session manager according to an embodiment of the present invention.
Figure 7B:
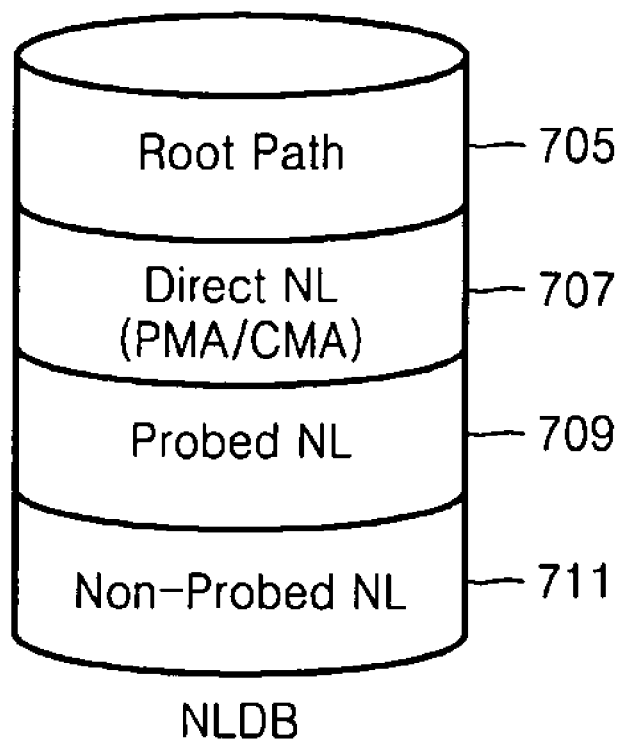
FIG. 7B is a diagram illustrating the structure of a database for managing memberships of a multicast agent according to an embodiment of the present invention.
Figure 8:
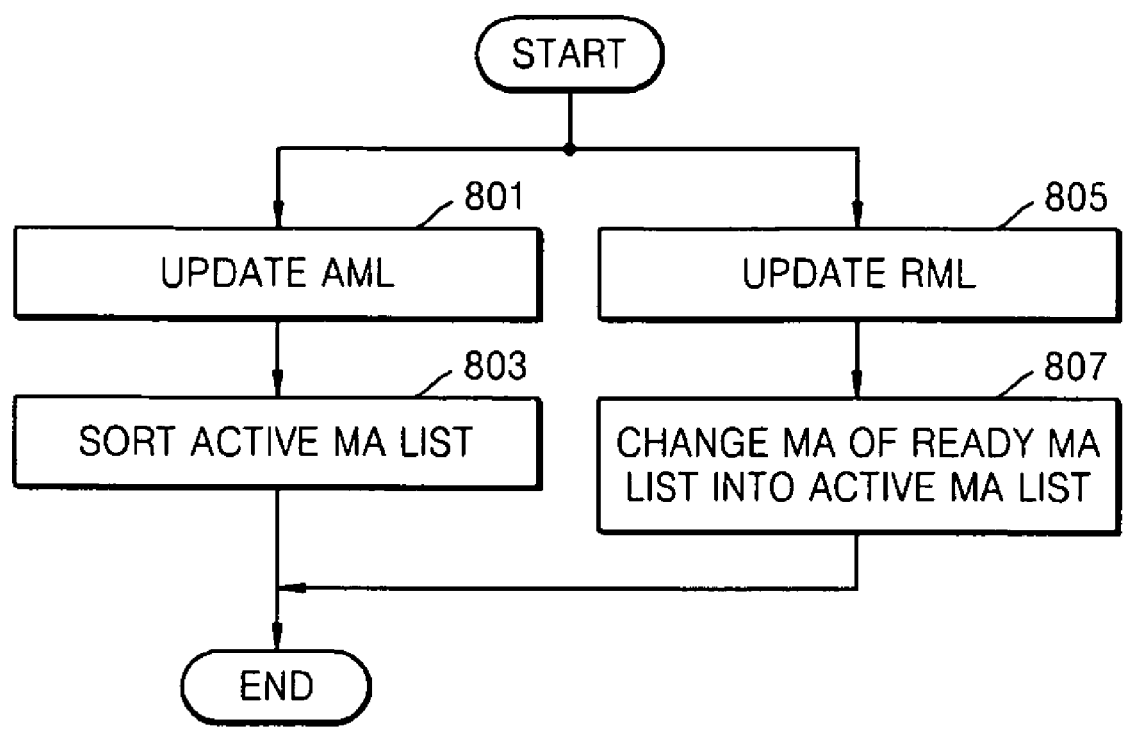
FIG. 8 is a flowchart illustrating a process of managing bootstrapping of a session manager according to an embodiment of the present invention.

Each operation of FIG. 5 will now be explained in more detail. First, the bootstrapping operation 510 performed by the bootstrapping unit 310 will be explained with reference to FIGS. 6A through 7B. FIG. 6A is a flowchart illustrating a bootstrapping process of an MA according to an embodiment of the present invention; FIG. 6B is a flowchart illustrating a bootstrapping process of an SM according to an embodiment of the present invention; FIG. 7A is a diagram illustrating the structure of a database for managing memberships by an SM according to an embodiment of the present invention; FIG. 7B is a diagram illustrating the structure of a database for managing memberships of an MA according to an embodiment of the present invention; and FIG. 8 is a flowchart illustrating a process of managing bootstrapping of an SM according to an embodiment of the present invention.

Boostrapping

This is a process in which nodes that first subscribe to a session first obtain information on an overlay multicast network. The bootstrapping process of an MA is illustrated in FIG. 6A. The start of the MA's bootstrapping 601 is transmission of a subscription request (SUBSREQ) to an SM in operation 603. The MA receives SUBSANS from the SM as a response to the request message, in operation 605. Through the SUBSANS message, it is determined whether or not the session subscription of the MA is approved or rejected, in operation 607. If the subscription is not approved, the MA cannot subscribe to the session, and if the subscription is approved, the SM provides to the MA information on a series of MAs already subscribing to the session and operating, so that the MA can perform bootstrapping.

The bootstrapping process of an SM is illustrated in FIG. 6B, and will now be explained. When a subscription request from a new MA is received in operation 611, SM determines whether or not to approve the subscription through controlling of approval to this request in operation 613. If a node is to be approved for subscription, the SM provides a set of bootstrapping information to the MA. For this, the SM extracts part of active_MA_List 701 in the MA_DB illustrated in FIG. 7A managed by the SM in operation 615. This information is loaded into a SUBSANS message, thereby notifying the MA that the subscription is approved, in operation 617. The SM updates read_MA_List 703 with new MA information in the MA_DB in operation 621, and prepares to receive a request from the new MA.

If the subscription of the new MA is not approved, the SM transmits to the MA a SUBSANS including reasons why the subscription is not approved, in operation 619.

The MA_DB managed by the SM is illustrated in FIG. 7A. The MA list DB is managed after being broadly divided into two types. The two types are an Active_MA_List 701 of MAs subscribing to a session and currently operating normally, and a Ready_MA_List 703 of MAs that applied for subscription but whose normal operations in the session are not confirmed.

Like the SM, MAs also manage MA DBs containing information on neighboring MAs, and as illustrated in FIG. 7B, the information of the MA's DB is different from the information in the SM's DB. The MA's DB includes a ROOT_PATH 705 storing a path from the root of the tree to which the MA belongs, a Direct NL 707 storing hierarchical information in the tree, a Probed NL 709 managing information related to probed neighboring nodes, and a Non-probed NL 711 of nodes whose information is obtained but not yet probed.

When MAs first subscribe to a session, session information from an SM must be received. For this, bootstrapping information is defined using the DB managed by the SM. To maintain the integrity of the stored data, the SM periodically probes MA lists that are broadcast to MAs for bootstrapping. For this, the SM updates the Active_MA_List 701 of the MA_DB in each update cycle in operation 801.

The process of updating the Active_MA_List 701 is followed by a sorting process 803 for sorting the Active_MA_List 701 in order to provide better bootstrapping information to MAs.

If a predetermined time passes, the SM updates the Ready_MA_List 703 in operation 805. This operation confirms whether or not a node subscribed to a session is actually operating in the session. Also, in order to transfer the information as bootstrapping information to a new MA, a process of changing nodes in the Ready_MA_List 703 into the Active_MA_List is performed in operation 807.

Figure 9:
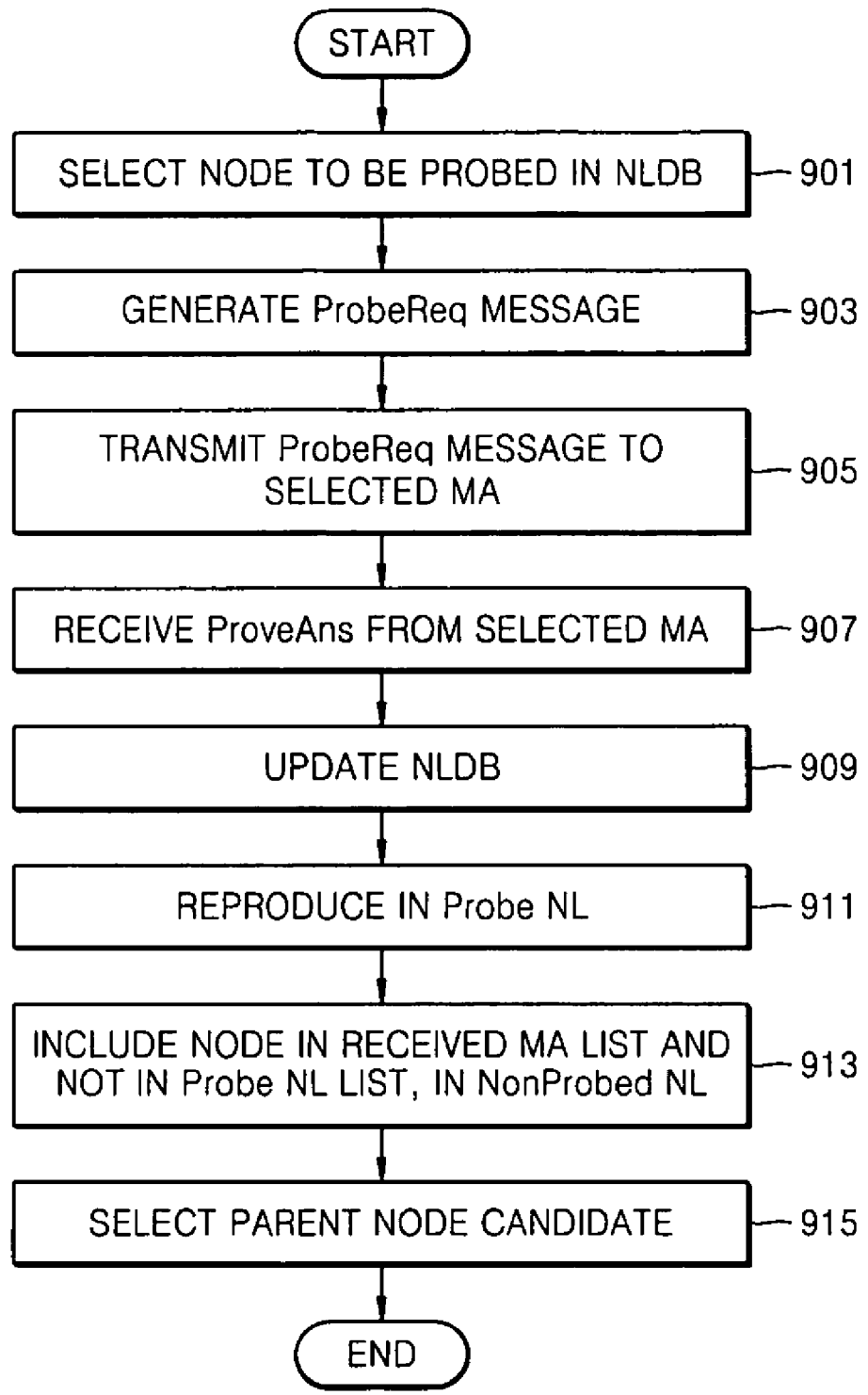
FIG. 9 is a flowchart illustrating a process of MAP discovery of a multicast agent according to an embodiment of the present invention.

The MAP discovery process performed by the MAP discovery unit 320 will now be explained in more detail with reference to FIG. 9. FIG. 9 is a flowchart illustrating a process of MAP discovery of an MA according to an embodiment of the present invention.

MAP Discovery

Through this process, an MA explores information of neighboring nodes in an overlay network environment. MAs perform MAP discovery at predetermined time intervals. The reason for performing the MAP discovery is that not all the nodes participating in the entire session are known by an MA, and therefore, it is necessary to select a better node in the overlay network by extending the list of neighbors known by that MA. For this, the MA exchanges information with its neighbor nodes, thereby performing the node exploring process.

The MAP discovery begins with a process of selecting a node to be probed using the neighbor list (NL) DB of the MA illustrated in FIG. 7B, in operation 901. The nodes to be probed are those in the non-probed list 711 in the NLDB managed by the MA. The MA generates a ProbeReq message to be transmitted to a selected node in operation 903. The neighbor list (NL) is included in this message. This ProbeReq message is transmitted to selected nodes in operation 905. As a response to the ProbeReq message, a ProbeAns message is received in operation 907. The ProbeAns message includes state information of a tree to which a node at the other end belongs, including the NL of the MA at the other end.

The MA receiving the ProbeAns message updates its NLDB in operation 909. The information on the MA transmitting the ProbeAns is stored in the ProbedNL 709. of the MA receiving the ProbeAns in operation 911. In the NL additionally received from the MA transmitting the ProbeAns, an NL not included in the ProbeNL list of the MA receiving the ProbeAns is included in the NonProbedNL. operation 913. Then, candidate parent nodes of the MA receiving the ProbeAns are selected from the ProbedNL, and through the selection of the candidate parent nodes, an optimum parent is selected from the Probed NL according to its policy in operation 915.

Figure 10:
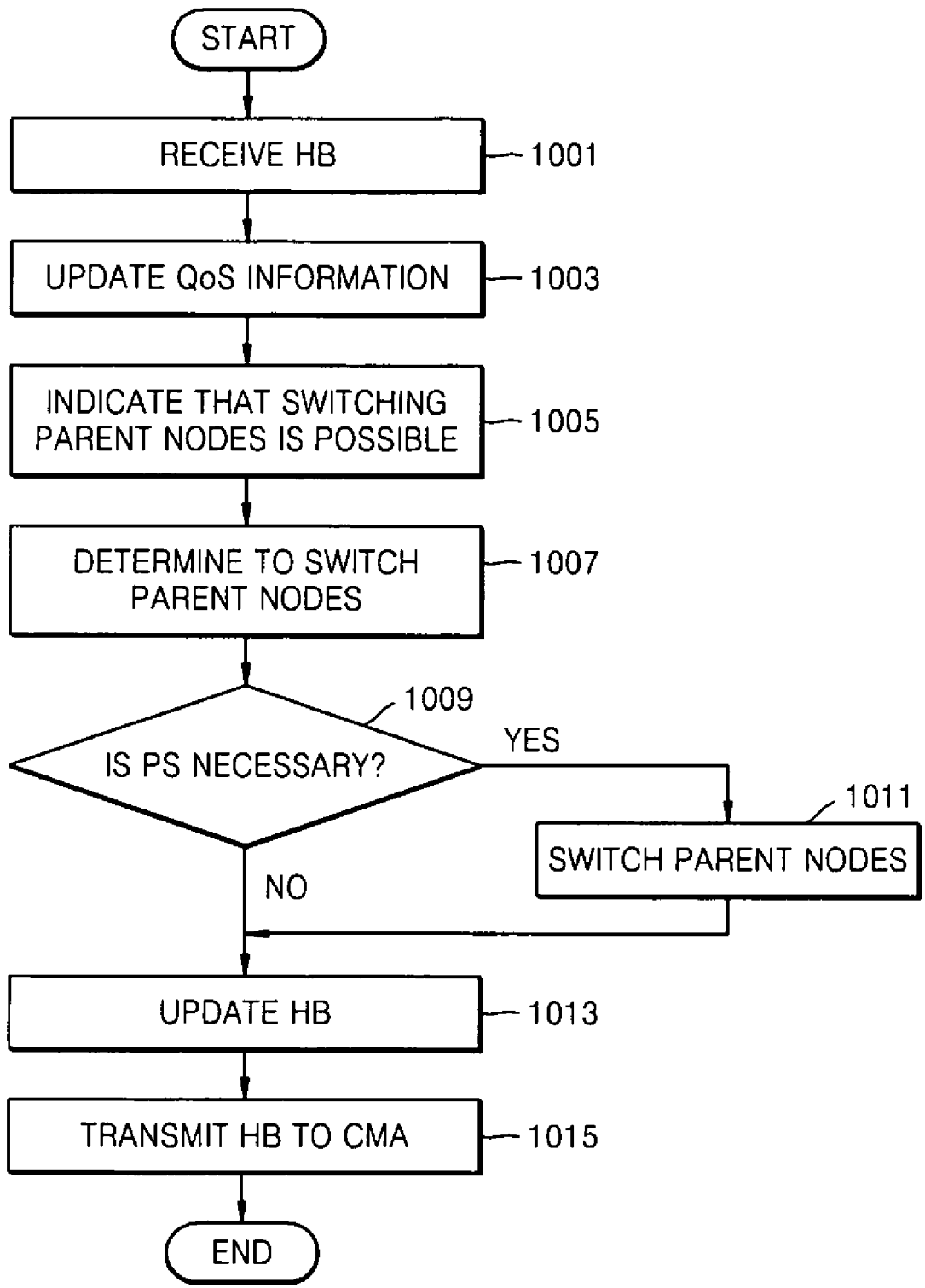
FIG. 10 is a flowchart illustrating a process of determining a parent node candidate and switching parent nodes according to an embodiment of the present invention.
Figure 11:
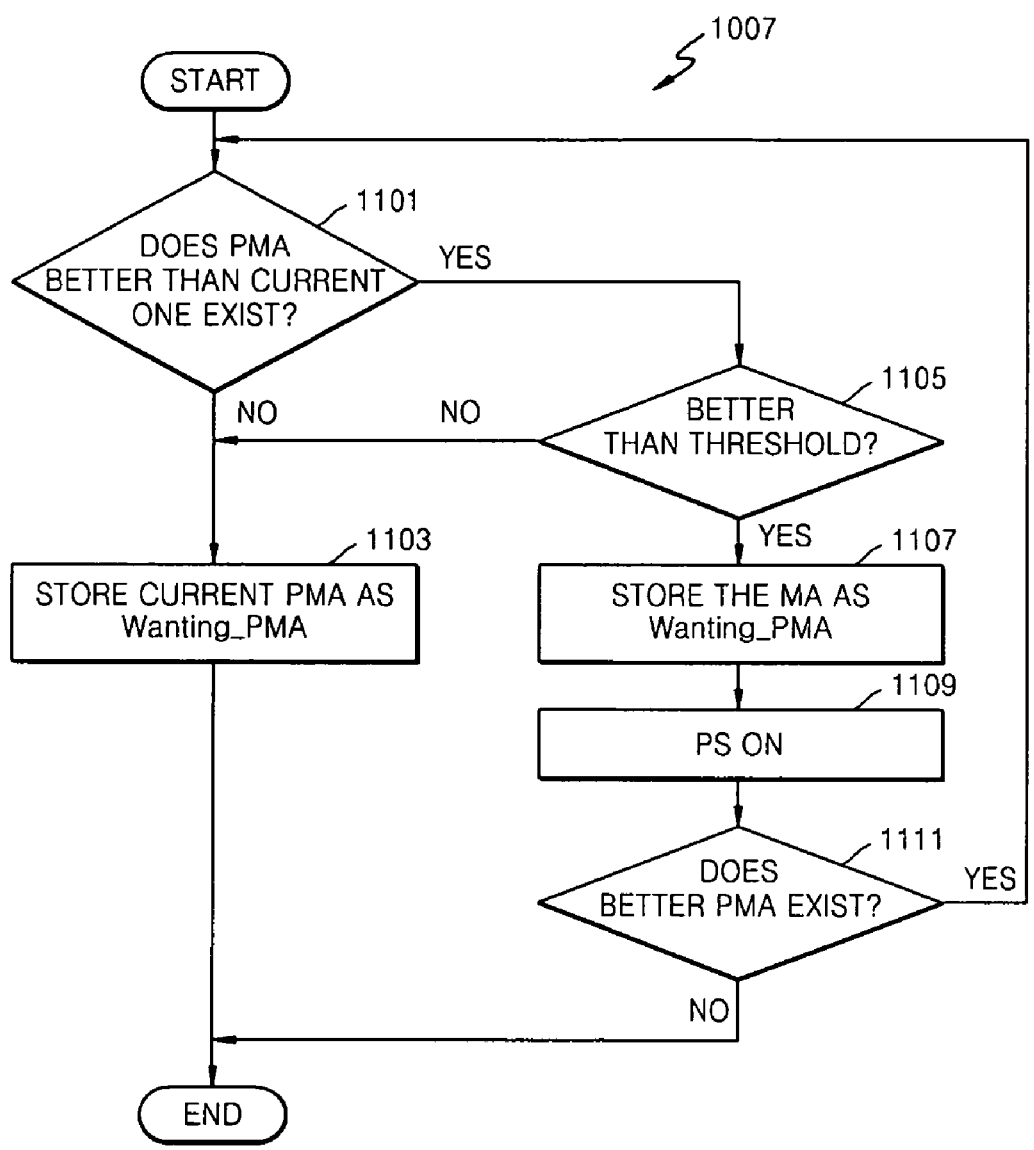
FIG. 11 is a more detailed flowchart illustrating an operation for determining a parent node illustrated in FIG. 10 according to an embodiment of the present invention.
Figure 12:
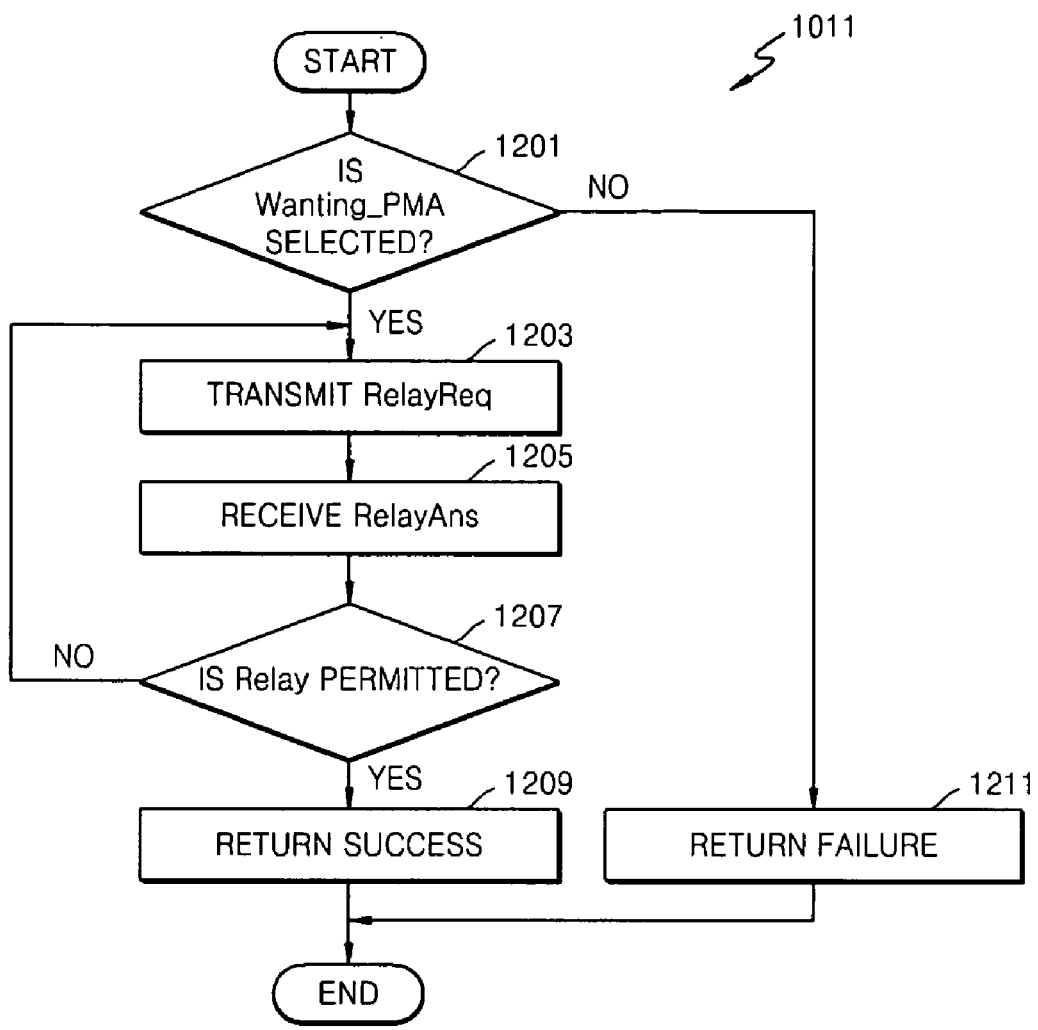
FIG. 12 is a more detailed flowchart illustrating an operation for switching parent nodes illustrated in FIG. 10 according to an embodiment of the present invention.

A process of determining and switching parent nodes, performed by the parent node unit 330, will now be explained in detail with reference to FIGS. 10 through 12. FIG. 10 is a flowchart illustrating a process of determining a parent node candidate and switching parent nodes according to an embodiment of the present invention. FIG. 11 is a more detailed flowchart illustrating an operation for determining a parent node illustrated in FIG. 10 according to an embodiment of the present invention. FIG. 12 is a more detailed flowchart illustrating an operation for switching parent nodes illustrated in FIG. 10 according to an embodiment of the present invention.

Parent Switching

Parent switching is performed to attach an optimum parent node based on measured information, thereby ultimately establishing an optimum multicast tree. If a better parent node than a current parent MA exists, MA must perform parent switching in order to improve the tree. If MAs on an identical branch of the tree perform parent switching at the same time, the tree structure may be broken. Accordingly, when an MA performs parent switching, unity of the parent switching must be guaranteed.

Parent switching (hereinafter referred to as "PS") begins with receiving a periodical heart beat (hereinafter referred to as "HB") from the root in operation 1001. The HB includes path information from the root to the MA receiving the HB, and the MA updates its available quality of service (QoS) information (information on delay, bandwidth, etc.) using the HB in operation 1003.

The QoS information is used to determine an optimum parent node MA according to the policy of a session. The MA receiving the HB indicates that the MA can switch parent nodes, in operation 1005. Then, a PS determination process, in which it is determined the extent to which the updated available QoS information is better than the QoS of the current parent node MA, is performed in operation 1007. This determination is performed by comparing the QoS with a threshold set by a network administrator. If it is required to perform PS in operation 1009, the MA performs the PS determination process in operation 1011. If the PS process is finished, the MA updates its information in a ROOTPATH 705 in operation 1013, and then forwards an HB to its child MAs (CMAs) in operation 1015.

In order to perform the PS process in operation 1011, the MA selects a Wanting_PMA that is determined to be optimum in its Probed NL 709, in operation 1201. If the Wanting_PMA does not exist, the MA does not perform the PS in operation 1211. Once the Wanting_PMA is selected, the MA sends a RelayRequest to the selected Wanting_PMA in operation 1203, thereby requesting the Wanting_PMA to operate as its PMA. According to data forwarding possibilities and policy, the Wanting_PMA notifies the new CMA through a RelayAns whether or not to approve data forwarding in operation 1205. If the Wanting_PMA approves forwarding, PS success is returned in operation 1209, and if it is not approved, a process of selecting a Wanting_PMA is repeatedly performed in operation 1201.

As a rule to select an optimum PMA, a node simply with a short hop distance is not selected, but the distance is determined according to the requirements of a service. For example, if a service is sensitive to transmission delay, the hop distance varies with respect to the transmission delay accumulated from the root, and if a service is sensitive to bandwidth, the distance varies with respect to the bandwidth from the root. The PS determination process in operation 1007 determines through this distance comparison whether or not to perform PS, and begins with an operation 1101 in which it is determined whether or not an MA better than a current PMA exists in the MA's Probed NL. If such an MA does not exist, the current PMA is selected as the Wanting_PMA and it is indicated that PS is not needed, in operation 1103. If such an MA is found, it is determined whether or not the MA is better than a threshold (Ps_THRESHOLD) set by a network administrator in advance, in operation 1105. If the MA is not better than the threshold, operation 1103 is performed. If the MA better than the threshold is found, the MA is stored in the Wanting_PMA list in operation 1107, and it is indicated that PS is needed, in operation 1109. Also, in order to update the Wanting_PMA list, it is determined whether or not better PMAs exist in operation 1111, and if a better PMA exists, operation 1101 and the following operations are repeatedly performed.

Figure 13:
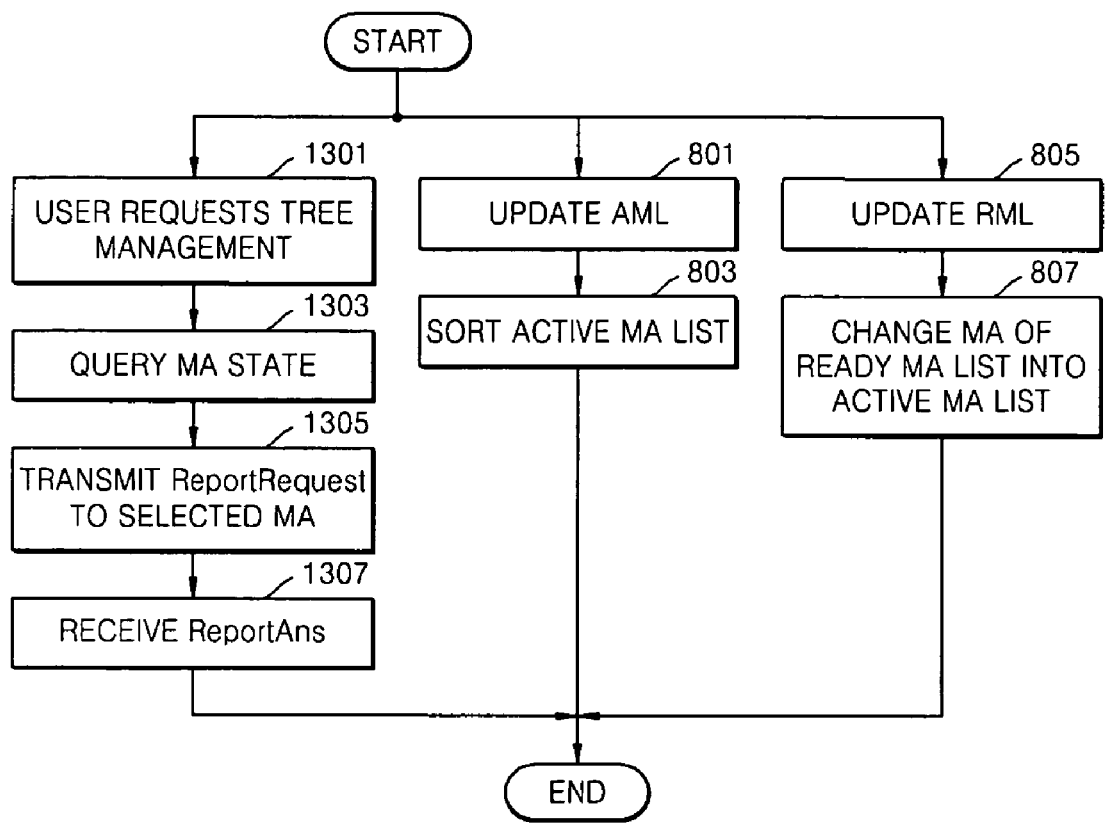
FIG. 13 is a flowchart illustrating an outline of a tree management operation of a session manager according to an embodiment of the present invention.
Figure 14:
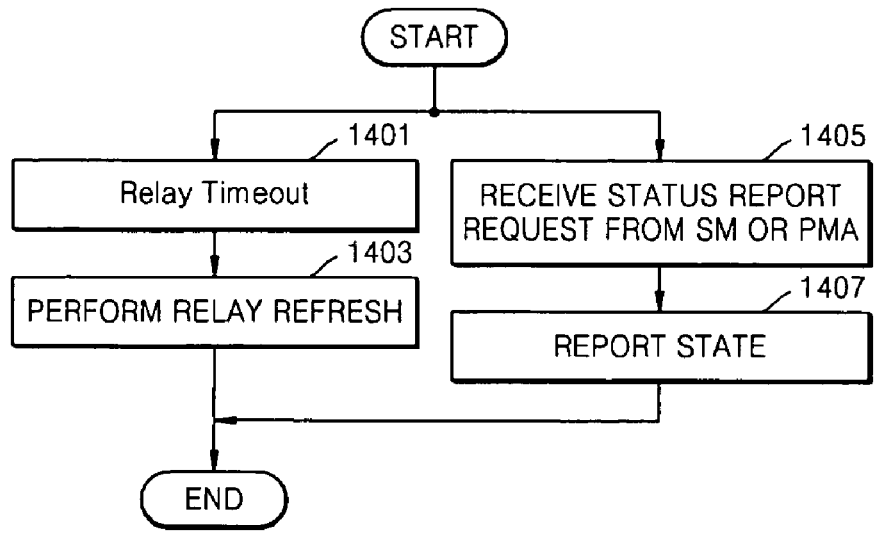
FIG. 14 is a flowchart illustrating an outline of a tree state management operation of a multicast agent according to an embodiment of the present invention.

A method of performing tree management will now be explained with reference to FIGS. 13 and 14. FIG. 13 is a flowchart illustrating an outline of a tree management operation of an SM according to an embodiment of the present invention, and FIG. 14 is a flowchart illustrating an outline of a tree state management operation of an MA according to an embodiment of the present invention.

Periodical Tree Information Management

Once an overlay multicast session begins, a method of managing the state of the session must be performed periodically or according to request in order to manage the session service and memberships.

The process of managing a tree varies with respect to an SM and an MA. The tree information management by the SM is performed when the state of a session must be measured according to a request from a user in operation 1301, when an active member list must be updated in operation 801, and when a Ready_MA list must be updated in operation 805. When a request from the user to manage the tree state arrives in operation 1301, an MA is asked its state in operation 1303. The inquiry process includes transmitting a ReportRequest requesting desired information from the MA in operation 1305, and receiving a ReportAnswer message from the MA in operation 1307. The information reported from the MA is transferred to the user, thereby allowing the user (or CP, administrator) to obtain information on the state of the session.

A tree management mechanism of an MA is broken down into a process for continuing a tree and a process for appropriately responding to a state report inquiry from an SM. In order to maintain a tree, at predetermined time intervals (Relay Time) in operation 1401, a RelayRefresh process is performed in operation 1403, in which the MA transmits a RelayRequest to its PMA and receives a RelayAnswer from the PMA. Also, when a ReportRequest from the PMA or SM is received in operation 1405, the state is reported to the PMA or SM.

Figure 15:
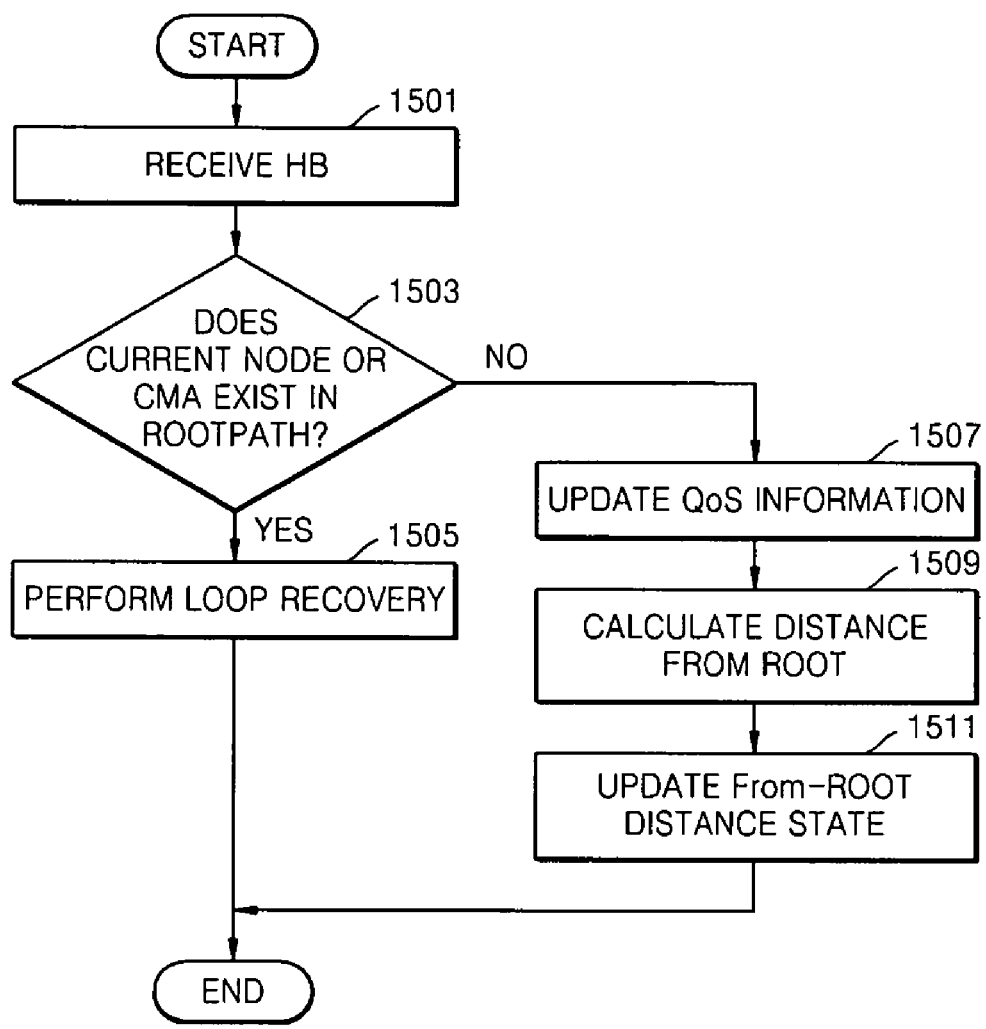
FIG. 15 is a flowchart illustrating a process of tree management by a multicast agent according to an embodiment of the present invention.
Figure 16:
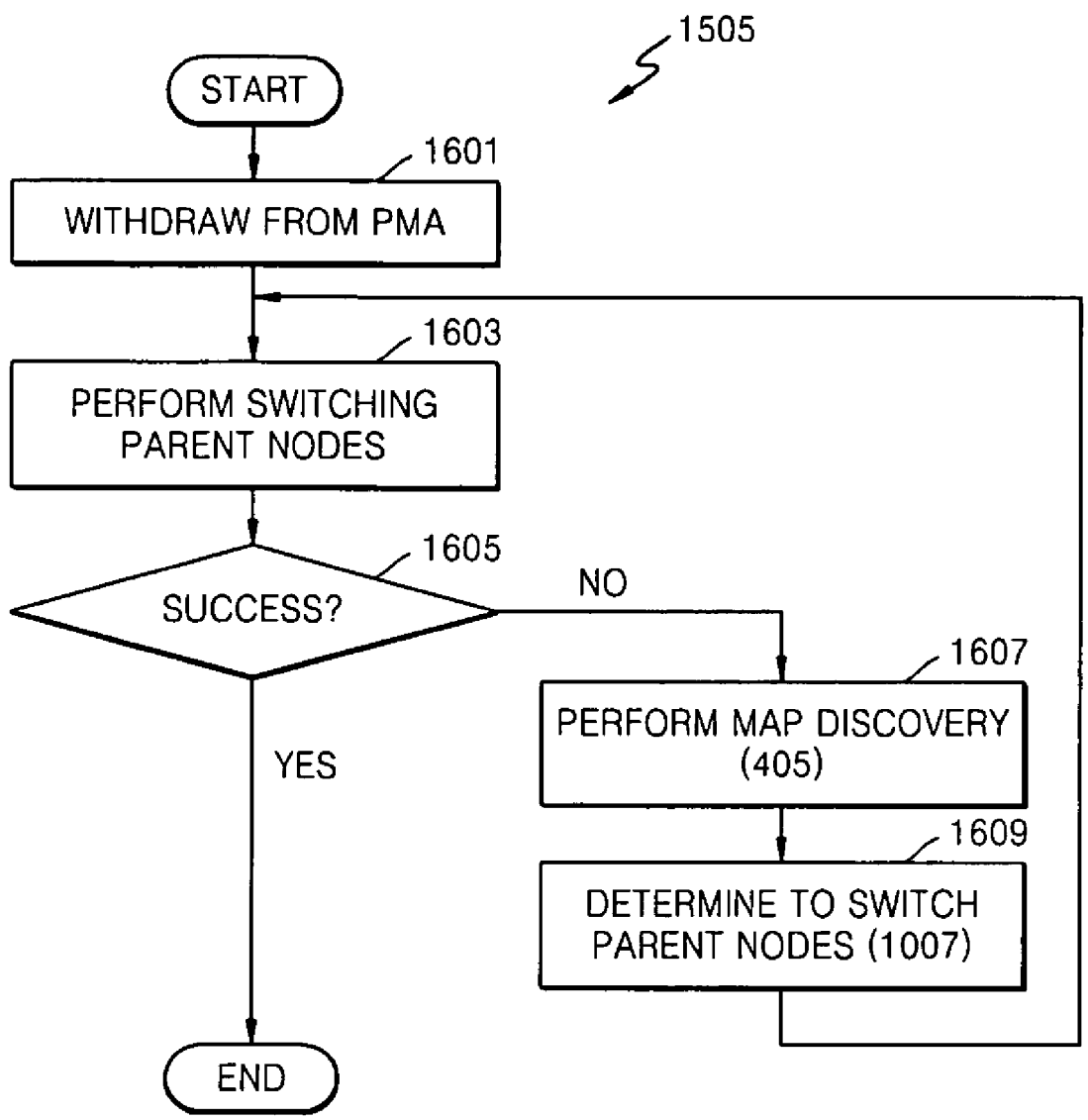
FIG. 16 is a flowchart illustrating a process of tree management by a multicast agent when a loop occurs according to an embodiment of the present invention.
Figure 17:
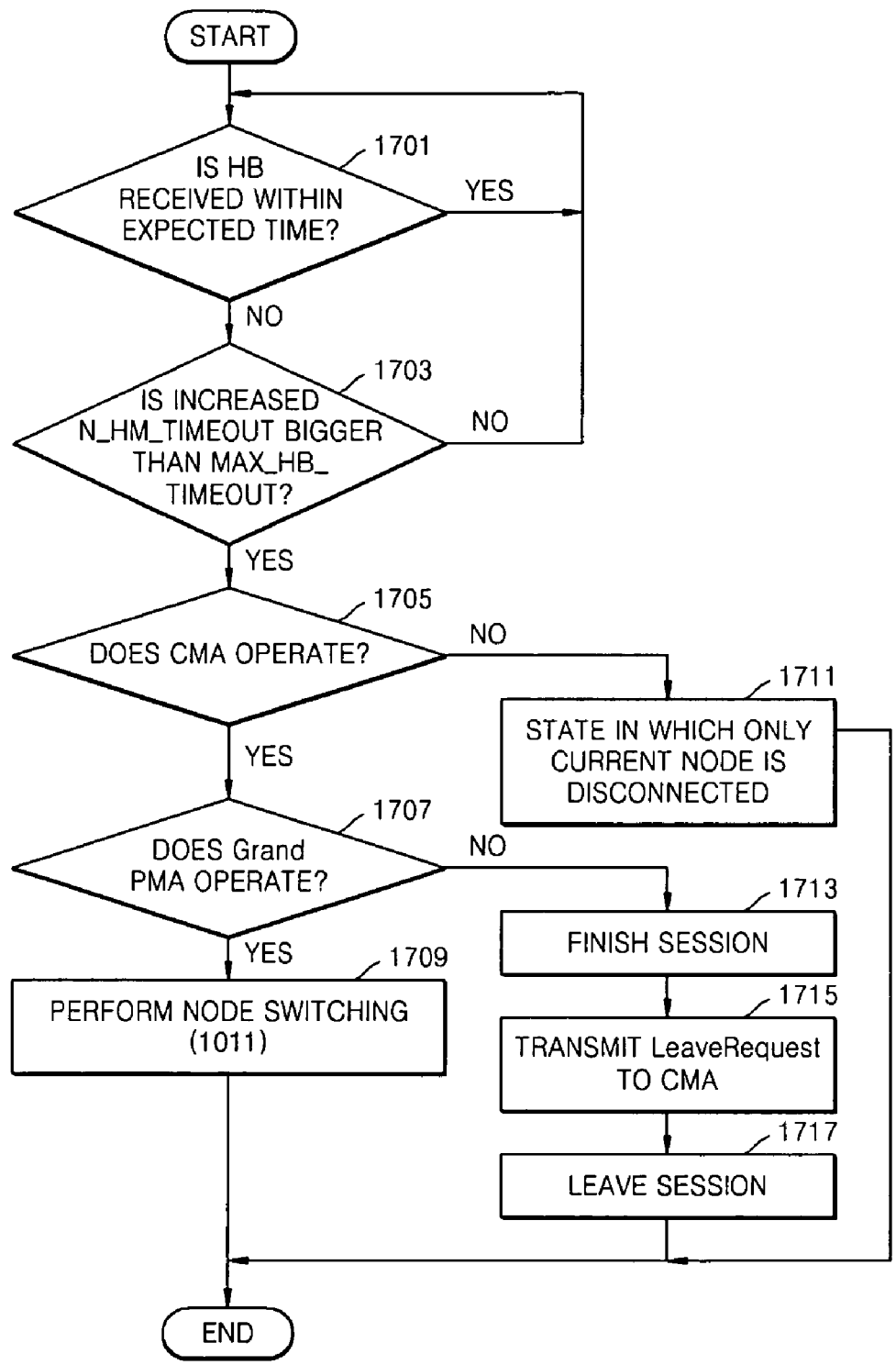
FIG. 17 is a flowchart illustrating a process of tree management by a multicast agent when network partitioning occurs according to an embodiment of the present invention.

A recovery process performed by a tree management unit (not shown) when a loop or networking partitioning occurs will now be explained. FIG. 15 is a flowchart illustrating a process of tree management by an MA according to an embodiment of the present invention, and FIG. 16 is a flowchart illustrating a process of tree management by an MA when a loop occurs according to an embodiment of the present invention. FIG. 17 is a flowchart illustrating a process of tree management by an MA when network partitioning occurs according to an embodiment of the present invention.

Tree Management

Intermediate nodes forming an overlay multicast tree formed of terminal hosts according to the present invention are not network equipment but PC applications such as an ordinary desktop PC. A data transmission tree formed of these nodes considers frequent starting and stopping of PC applications, and an overlay network different from an actual network environment. Accordingly, the tree must be robust against a variety of errors that can occur when PS is attempted, in order to overcome inefficiency that could otherwise occur.

Serious errors caused by a network in an overlay multicast environment are loop formation and network partitioning.

First, the loop will be explained. A loop can be sensed when an HB is received in operation 1501. It is determined whether or not a current node or its CMA list exists in a ROOTPATH including a path from the root to the node in operation 1503. If the node or the list exists, LoopRecover is performed in operation 1505, or else QoS information is updated through the ROOTPATH in operation 1507.

In the QoS information update process in operation 1507, the distance from the root is calculated in operation 1509, and using the distance, the From_ROOT distance state is updated in operation 1511.

The loop recovery process in operation 1505 begins with withdrawing from a PMA in order to break the loop, in operation 1601. Then, a PS process to switch to a new PMA is performed in operation 1603.

It is determined whether or not the PS is successful in operation 1605, and if the loop recovery process is not successful, a new MAP discovery process 405 is performed in operation 1607, and then it is determined whether or not to perform PS in operation 1609. Then, a PS process in operation 1603 is performed again.

The network partitioning detection process will now be explained.

Detection of network partitioning begins when a periodical HB is not received within an expected time in operation 1701. If an HB is not received in an HB cycle, N_HB_TIMEOUT is incremented by 1 each time. It is determined whether or not the N_HB_TIMEOUT value is greater than a MAX_HB_TIMEOUT value, in operation 1703, and if the N_HB_TIMEOUT value is greater than the MAX_HB_TIMEOUT value, partitioning recovery begins.

In the partitioning recovery, first, in order to confirm whether only upstream is cut off, it is examined whether the CMA of the node operates, in operation 1705. If the CMA is also cut off, it is determined that only the current node is cut off from the network, in operation 1711. If the CMA is alive, it is confirmed whether the next-higher-level PMAs are alive through the ROOTPATH of the current node, in operation 1707. If the next-higher-level PMA does not operate, it is determined that the session is finished in operation 1713, and a LeaveRequest is transmitted to the CMAs of the current node, thereby indicating that the session is finished, in operation 1715. Then, the current node leaves the session in operation 1717. If any one of the next-higher-level PMAs operates, PS is attempted in operation 1709.

Figure 18:
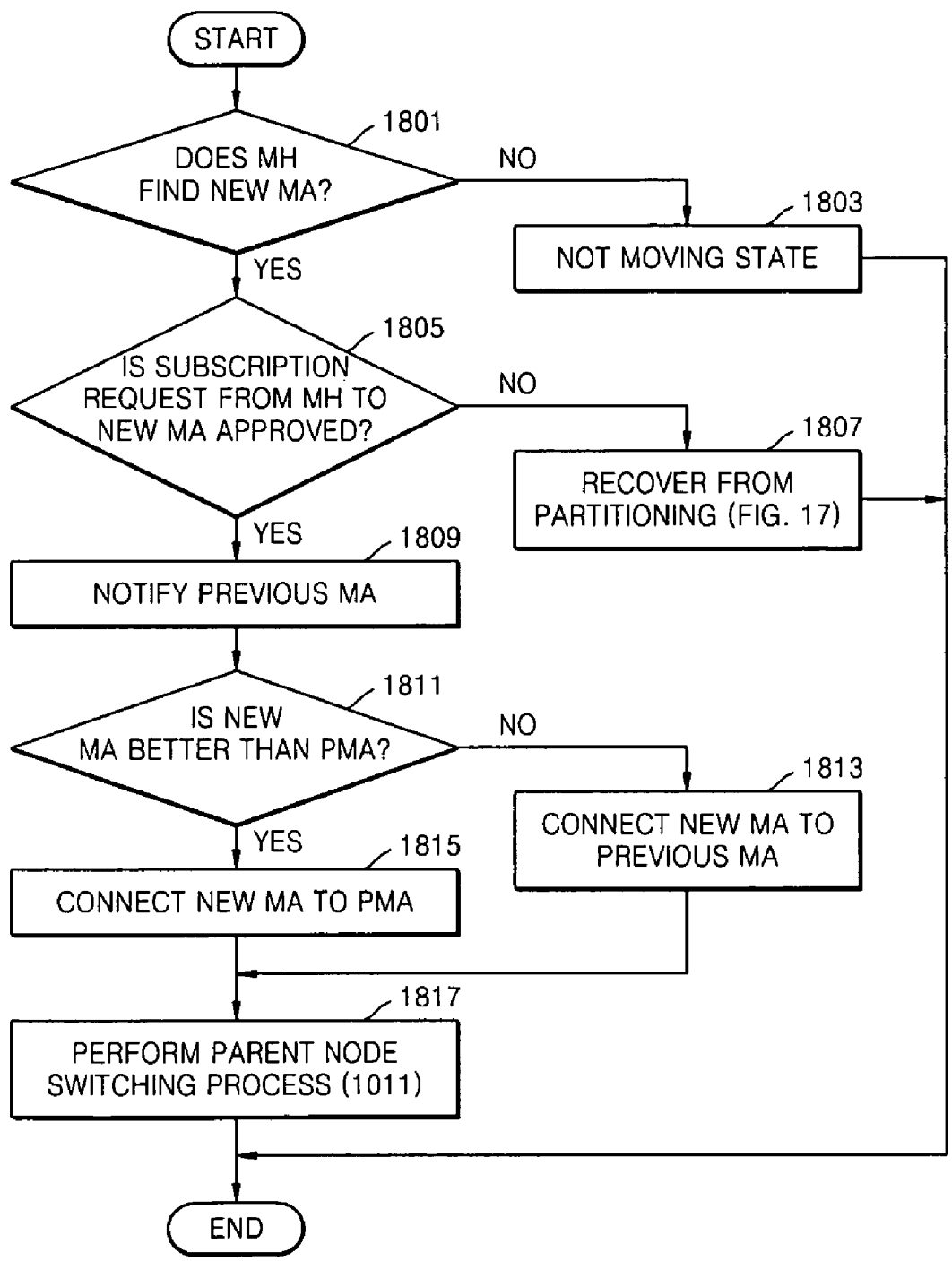
FIG. 18 is a flowchart illustrating a supporting process of a multicast agent in order to guarantee mobility of a mobile host (MH) according to an embodiment of the present invention.

Finally, a method of supporting handover for a mobile node in relation to the operation of a handover supporting unit (not shown) will now be explained with reference to FIG. 18. FIG. 18 is a flowchart illustrating a supporting process of an MA in order to guarantee mobility of an MH according to an embodiment of the present invention.

MH Transit

When an MH moves from a WLAN, a new data transmission path must be formed from a transmission node (root). For this, assuming a pure mobile multicast, even in the central point of an SPT tree, the tree must be changed. In relation to this reconstruction of a tree, in the present invention, the changing of a transmitter tree is minimized and thus fast handover is enabled. This mechanism also has the advantage that the motion of the MH can be predicted through a cache.

The MH transit process will now be explained. If an MH finds a new mobile MA (MMA) in operation 1801, it means that the MH has moved to a new WLAN network, and if the MH does not find a new MMA, it means that the MH has not move from a WLAN network in operation 1803. If the MH has moved to a new WLAN network, the MH requests subscription to a newly found MA (new_MMA) in operation 1805. If the subscription request is approved, the MH provides its previous MMA in operation 1809. If the subscription request is not approved, the partitioning recovery process described in FIG. 17 is performed in operation 1807.

The new_MMA obtaining information on the MA (old_MMA) to which the MH was connected decides to select a new PMA or the old_MMA of the MH as the PMA of the new_MMA, in operation 1805.

If information on a better PMA than the old_MMA of the MH exists in the cache of the new_MMA, the new_MMA is connected to the PMA, or else the new_MMA is connected to the old_MMA of the MH in operation 1813. Once connection is successful, the new_MMA continues the PS process in order to optimize the tree in operation 1817.

According to the multicast agent and the method of configuring a 1:N overlay multicast network considering a WLAN environment of the same, multicast communication can be easily introduced into a wireless environment without particular modification of existing Internet router equipment. In particular, ordinary individuals as well as Internet service providers (ISPs) supporting a mobile communication environment can transmit group data as MHs.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims. The preferred embodiments must be considered in a descriptive sense only, and not for purposes of limitation. Therefore, the scope of the invention is defined not by the detailed description of the invention but by the appended claims, and all differences within the scope will be construed as being included in the present invention.

What is claimed is:

1. A method of configuring a 1:N overlay multicast network considering a wireless local area network (WLAN) environment of a multicast agent, the method comprising:
   a session manger generating a first database with entries of multicast agents subscribing to a session and multicast agents that have applied for subscription to a session but have not been confirmed for normal operation;
   a multicast agent generating a second database with entries of a path from the root of a tree to which the multicast agent belongs, a hierarchical relation in the tree, the list of probed neighboring nodes, and a list of not-probed neighboring nodes;
   the multicast agent subscribing to the overlay network;
   obtaining information on neighboring multicast agents;
   setting a multicast agent which is determined to be optimal based on the obtained information, as a parent node; and
   if a multicast agent providing a tree improved from the current tree is found, changing the parent node.

2. The method of claim 1, wherein the multicast agent's subscribing to the overlay network comprises:
   the multicast agent requesting the session manager for subscription to the session; and
   if the session manager approves the subscription request, the session manager providing the multicast agent with information on multicast agents that subscribe to the session and operate, by referring to the first database.

3. The method of claim 1, wherein the session manager periodically checks the state of the multicast agents included in the entries of the first database and updates information on whether or not the multicast agents operate normally.

4. The method of claim 1, wherein the obtaining of the information on neighboring multicast agents comprises the multicast agent diagnosing transmission qualities including transmission delay and bandwidth of its neighboring nodes, then selecting a good neighboring node, and then updating the second database.

5. The method of claim 4, wherein the multicast agent's diagnosing transmission qualities, selecting a good neighboring node, and then updating the second database comprises:
   selecting a multicast agent in the list of not-probed neighboring nodes of the second database and transmitting a probe request message together with the list of multicast agents known to the current multicast agent;
   receiving a response including the state information of a tree transmitted by a multicast agent receiving the probe request message, the tree to which the multicast agent receiving the probe request message belongs; and
   adding the multicast agent transmitting the response to the list of the probed neighboring nodes in the second database, and if a node that is included in the node list included in the state information of the tree but is not included in the list of the probed neighboring nodes exists, adding the node.

6. The method of claim 1, wherein in the setting of the multicast agent which is determined to be optimal based on the obtained information, as a parent node, the parent node is selected from the list of the probed neighboring nodes in the second database according to a predetermined policy.

7. The method of claim 1, wherein the changing of the parent node comprises:
   receiving a heart beat periodically from the root;
   updating the multicast agent's QoS information based on the heart beat;
   comparing the QoS information with the QoS according to the connection to the current parent node for a better QoS, and determining to switch parent nodes;
   if the parent switching is determined according to the comparison result, selecting a candidate node in the list of the probed neighboring nodes in the second database;
   requesting the candidate node to operate as a parent node; and
   if the response to the request is negative, repeatedly performing the selecting of a candidate node and requesting the candidate node to operate as a parent node.

8. The method of claim 7, wherein the comparing of the QoS information with the QoS according to the connection to the current parent node for a better QoS, and determining to switch parent nodes comprises:

searching the list of the probed neighboring nodes of the second database for a multicast agent better than the current parent node; and if no better multicast agent is found, maintaining the current parent node, and if a better multicast agent is found, comparing that multicast agent with a threshold of a service desired to be provided, and if the multicast agent does not meet the threshold, maintaining the current parent node, and if the multicast agent exceeds the threshold, switching the parent node to the found multicast agent.

9. The method of claim 1, further comprising:

if a request from a user to manage the state of the tree is received, asking a multicast agent corresponding to the request, for the state, then receiving a response to the request and transferring session information to the user; and the multicast agent periodically transmitting a tree continuation message to the parent node and receiving a tree continuation message from the parent node, thereby refreshing tree information.

10. A method of configuring a 1:N overlay multicast network considering a WLAN environment of a multicast agent, the WLAN environment formed of one or more multicast agents, the method comprising:

if a loop is detected based on a heart beat received from a root node, changing a parent node; and if network partitioning is detected based on whether or not the heart beat is periodically received, changing the parent node, and wherein the changing to the new parent node comprises:

if the heart beat is not periodically received over a predetermined reference value, determining to recover from partitioning;

if the company multicast agent operates normally, examining the operation of a next-higher-level parent node, and if the next-higher-level parent node does not operate, declaring session termination; and if any one of the next-higher-level parent nodes operate, switching the parent nodes.

11. A method of configuring a 1:N overlay multicast network considering a WLAN environment of a multicast agent of one or more multicast agents forming the 1:N multicast network in the WLAN environment, the method comprising:

receiving a subscription request from a mobile node moving into a region controlled by a current multicast agent;

if authentication of the mobile node is successful, obtaining information on a multicast agent to which the mobile node was connected, from the mobile node;

according to the information, determining to select as the parent node of the current node, a new multicast agent or the multicast agent to which the mobile node was connected; and performing parent node switching for optimizing a tree.

12. The method of claim 11, wherein the performing of the parent node switching comprises:

receiving a heart beat periodically from the root;

updating the multicast agent's QoS information based on the heart beat;

comparing the QoS information with the QoS according to the connection to the current parent node for a better QoS, and determining to switch parent nodes;

if the parent switching is determined according to the comparison result, selecting a candidate node in the list of the probed neighboring nodes in a database generated by a multicast agent with entries of a path from the root of a tree to which the multicast agent belongs, a hierarchical relation in the tree, the list of probed neighboring nodes, and a list of not-probed neighboring nodes;

requesting the candidate node to operate as a parent node; and if the response to the request is negative, repeatedly performing the selecting of a candidate node and requesting the candidate node to operate as a parent node.

13. The method of claim 12, wherein the comparing of the QoS information with the QoS according to the connection to the current parent node for a better QoS, and determining to switch parent nodes comprises:

searching the list of the probed neighboring nodes of the second database for a multicast agent better than the current parent node; and if no better multicast agent is found, maintaining the current parent node, and if a better multicast agent is found, comparing that multicast agent with a threshold of a service desired to be provided, and if the multicast agent does not meet the threshold, maintaining the current parent node, and if the multicast agent exceeds the threshold, switching the parent node to the found node.

14. A multicast agent forming a 1:N overlay multicast network considering a WLAN environment, the multicast agent comprising:

a first database generated by a session manger with entries of multicast agents subscribing to a session and multicast agents that have applied for subscription to a session but have not been confirmed for normal operation;

a second database base generated by the multicast agent with entries of a path from the root of a tree to which the multicast agent belongs, a hierarchical relation in the tree, the list of probed neighboring nodes, and a list of not-probed neighboring nodes;

a bootstrapping unit obtaining information on the multicast agents subscribing to the session and operating, in the first database, if a subscription to the session is requested from the session manager and the request is approved;

a MAP discovery unit updating the second database by measuring the transmission qualities of the multicast agents, examining the not-probed neighboring nodes, and then updating the list of the probed neighboring nodes with authenticated nodes;

a parent node unit selecting a multicast agent optimal for configuring a network based on the information, as a parent node, and switching parent nodes based on periodically updated information.

15. The multicast agent of claim 14, further comprising a tree management unit determining, based on a heart beat transmitted by a root node, whether or not a loop occurs, and if the loop occurs, performing loop recovery in which the loop is cut off and a new parent node is set, and if network partitioning occurs, determining whether or not a session is finished, and if the session is finished, withdrawing from the session, and if the session is not finished, performing network partitioning recovery in which a parent node is set.

16. The multicast agent of claim 14, further comprising a handover supporting unit, if a newly entered mobile node is authenticated, comparing information on the previous multicast agent to which the mobile node was connected, with information on the parent node in the tree, and determining a node with better characteristics as a parent node, and providing a wireless data service to the mobile node.

* * * * *